United States Patent

[11] 3,543,674

| [72] | Inventor | Walter A. Kunze |
| | | Chillicothe, Ohio |
| [21] | Appl No | 737,239 |
| [22] | Filed | June 14, 1968 |
| [45] | Patented | Dec. 1, 1970 |
| [73] | Assignee | Aluminum Company of America |
| | | Pittsburgh, Pennsylvania |
| | | a corporation of Pennsylvania |

[54] FONDUE COOKING UTENSIL
5 Claims, 3 Drawing Figs.

[52] U.S. Cl. .................................................. 99/403
[51] Int. Cl. ............................................... A47j 37/12
[50] Field of Search .......................................... 99/403, 416, 417, 448

[56] References Cited
UNITED STATES PATENTS
3,038,402   6/1962   Singer ........................ 99/403
FOREIGN PATENTS
229,565   2/1925   Great Britain ................ 99/417

Primary Examiner—Walter A. Scheel
Assistant Examiner—Leon G. Machlin
Attorney—Edward B. Foote ABSTRACT: A cooking utensil combination including a pan suitable for preparing foods such as cheese or chocolate fondue and a sheet metal insert by which the pan may be adapted for fondue cooking using hot oil or bouillon, the insert also serving as a fork holder.

Patented Dec. 1, 1970

3,543,674

INVENTOR
WALTER A. KUNZE

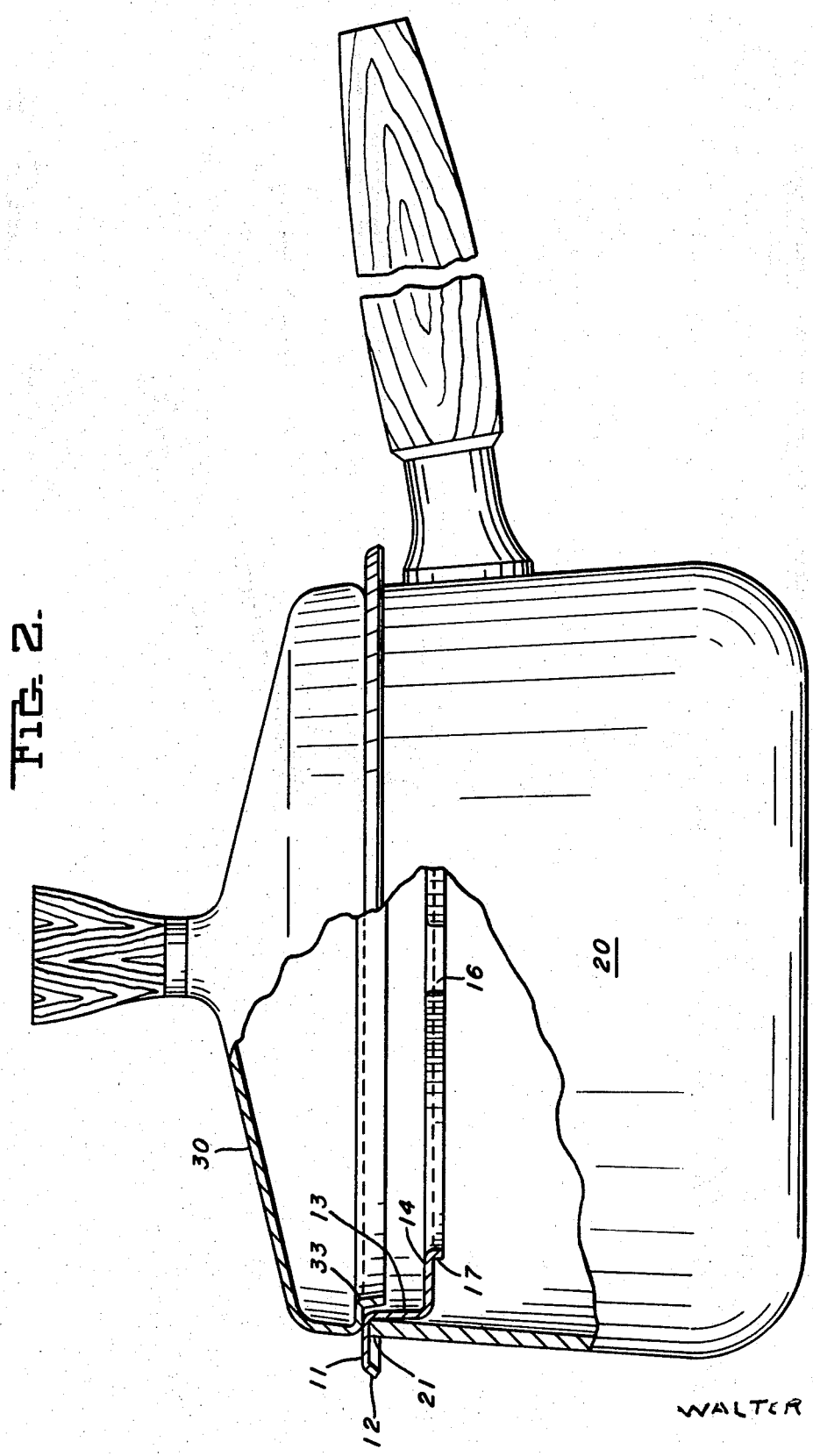

FONDUE COOKING UTENSIL

BACKGROUND OF THE INVENTION

It is an increasingly popular practice in entertaining to prepare foods at the table in the manner known as fondue cooking. A cooking utensil combination useful for this purpose may comprise a vessel such as a sauce pan, a stand therefor, a heating device and a supporting tray. When such a combination is used in preparing fondue, long handled forks or like implements are required, and a rack for holding these implements should be provided.

For preparing cheese or chocolate fondue, a pan with a wide rim opening is desirable, because these mixtures are held at low temperatures and require frequent stirring. However, a wide rim pan usually is not desirable for cooking small pieces of meat in hot oil or bouillon. Fondue recipes of this type require the meat to be immersed, by means of forks, in oil heated to 400° or in boiling bouillon. This causes the oil or bouillon to spatter violently so that it may cause burns as well as staining clothing and table linen. Too, it may be deposited on the side of the pan, or on the stand and the tray, requiring vigorous cleaning they may mar the finish of these parts, an important consideration in a utensil combination used at the table or buffet. For these reasons, a pan intended for such fondue cooking usually has a tapered wall to provide a restricted opening.

SUMMARY OF THE INVENTION

A pan with a wide rim opening, such as a sauce pan, suitable for the low temperature preparation of foods such as cheese or chocolate fondue, is provided with an insert by means of which it is adapted for the cooking of foods by immersion in hot oil or bouillon. The insert has an opening large enough to permit the food to be immersed in the oil or bouillon by means of long handled forks, but small enough that the insert acts as a shield preventing the spattering of hot oil or boiling bouillon onto surrounding surfaces or the exterior surface of the vessel. The edge of the opening is contoured to provide notches to receive the handles of a number of forks to support them with handles extending upwardly so that they can be grasped readily for use.

BRIEF DESCRIPTION OF THE DRAWINGS

FIG. 2 is an elevation, partly in section, of a sauce pan and cover with the insert in place therein.

DESCRIPTION OF THE PREFERRED EMBODIMENT

Figure 1:
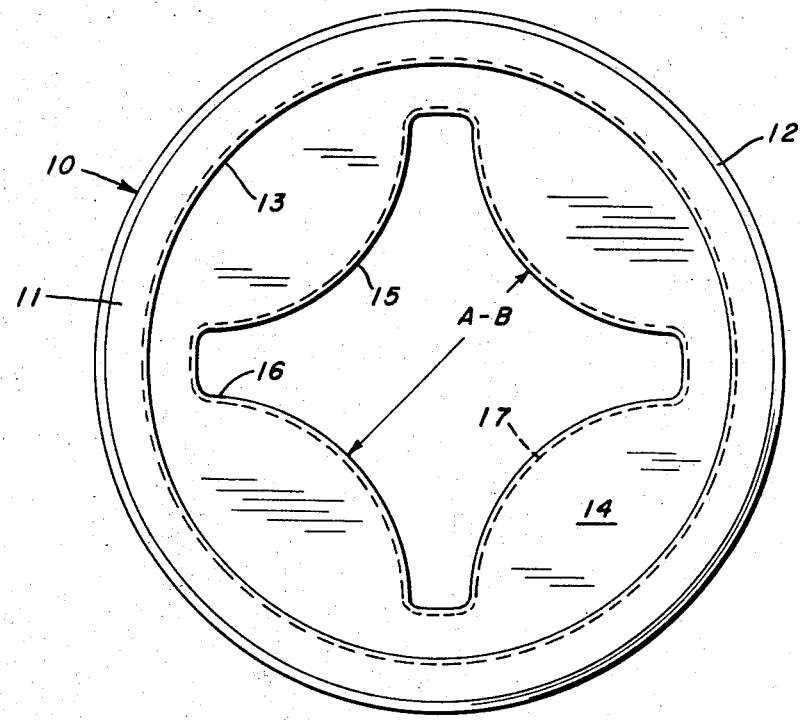
FIG. 1 is a plan view of the insert.
Figure 3:
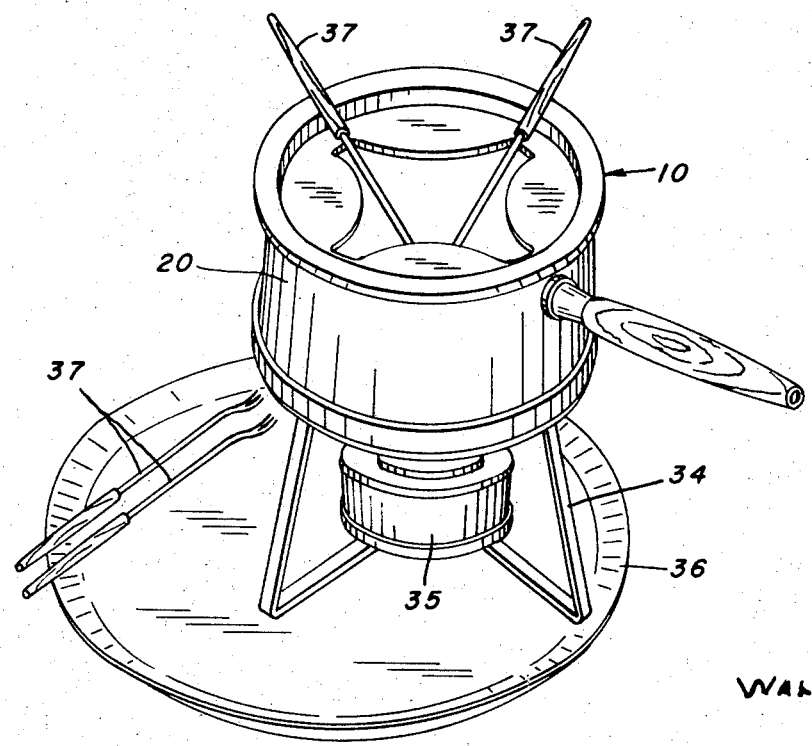
FIG. 3 is a perspective view of the association of the sauce pan, insert, stand, heating device and tray and also illustrating the manner in which forks are supported by the insert.

The insert 10 is drawn and blanked from sheet metal. It has a horizontal top flange 11 with downwardly flared edge 12. A depending cylindrical wall 13 connects the flange 11 and the center panel 14. The opening 15 in the center panel is recessed to provide four notches 16 and the blanking operation may, if desired, provide a small vertical flange 17 forming a wall for the opening.

The insert is assembled with a sauce pan 20, the flange 11 bearing on the rim 21 of the pan, the center panel 14 lying below the rim and the edge 12 extending outwardly and downwardly above the side of the pan. The cover 30 for the pan has a flange 33 of a size to be received within the wall 13. It will be seen, by reference to FIG. 2, that the outer diameter of the cover is greater than the inner diameter of the vessel so that the cover, when used without the insert, must rest upon the rim of the vessel. A stand 34, heating device 35, tray 36 and forks 37 complete the assembly.

The notches should extend nearly to the wall 13 in order to support the fork handles at a convenient angle, and the central opening must be large enough for ready insertion of the food to be cooked. However, the remaining portion of the panel 14 must be of sufficient extent to provide an effective spatter shield. To meet these opposed needs, I have found that maximum effectiveness is attained with a pan and insert as shown in the drawings. In this form, the notches end a little less than one-half inch from the wall 13 and are joined by arcuate portions extending to about 1½ inches inward from the wall, the distance A—B between each two opposed arcuate portions being about 2.25 inches.

It will be understood that the edge 12, overhanging the outer side of the pan, affords additional protection for this surface.

When the combination is to be used for preparing meats in oil or bouillon, the oil on bouillon is heated in the open pan and, when the proper temperature is reached, the pan and insert are placed upon the stand over the heating device. The meat can then be speared on the forks 37 and passed through the opening 15 into the oil or bouillon. The notches 16 support the forks while they are in the pan.

The provision of the cover 30 as described above and shown in the drawings adapts the pan for the usual range of sauce pan uses, and the flange 33, fitting within the wall 13, provides a compact arrangement when the combination is not in use.

While the invention has been described in terms of preferred embodiments, the claims appended hereto are intended to encompass all embodiments which fall within the spirit of the invention.

I claim:

1. A cooking utensil combination comprising:
    a vessel having an upstanding wall presenting an upper edge providing a supporting surface; and
    a removable insert therefor formed of a single piece of sheet metal and having:
        a horizontal flange to rest upon said supporting surface;
        a vertical wall portion within and depending from said flange and receivable within the vessel wall; and
        a central panel below said flange having an opening therethrough defined by an edge having a plurality of notches therein.

2. A cooking utensil combination as in claim 1 in which the horizontal flange extends radially beyond the vessel wall.

3. A cooking utensil combination as in claim 1 in which the edge of the opening has a depending vertical flange.

4. A cooking utensil combination as in claim 1 in which the minimum dimension of the opening is about 2.25 inches and the notches extend to about 0.5 inch from the vertical wall.

5. A cooking utensil combination as in claim 1 and including a cover with a depending flange receivable within the said vertical wall and resting upon the vessel rim when the insert is removed.